US012663535B2

(12) United States Patent
Shi et al.

(10) Patent No.: US 12,663,535 B2
(45) Date of Patent: Jun. 23, 2026

(54) MULTI-SENSOR FUSION METHOD AND SYSTEM FOR INTELLIGENT DRIVING VEHICLES

(71) Applicant: CHONGQING UNIVERSITY OF POSTS AND TELECOMMUNICATIONS, Chongqing (CN)

(72) Inventors: Junren Shi, Chongqing (CN); Jun Gao, Chongqing (CN); Changhao Piao, Chongqing (CN); Lin Xu, Chongqing (CN); Weisheng He, Chongqing (CN); Jianguo Miao, Chongqing (CN); Kexin Li, Chongqing (CN); Yongkang Su, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 277 days.

(21) Appl. No.: 18/573,463

(22) PCT Filed: May 26, 2023

(86) PCT No.: PCT/CN2023/096478
§ 371 (c)(1),
(2) Date: Dec. 22, 2023

(87) PCT Pub. No.: WO2024/001629
PCT Pub. Date: Jan. 4, 2024

(65) Prior Publication Data
US 2025/0102663 A1 Mar. 27, 2025

(30) Foreign Application Priority Data
Jul. 1, 2022 (CN) .......................... 202210768001.5

(51) Int. Cl.
*G01S 13/86* (2006.01)
*G01S 13/72* (2006.01)
(Continued)

(52) U.S. Cl.
CPC ............ *G01S 13/865* (2013.01); *G01S 13/72* (2013.01); *G01S 13/931* (2013.01); *G01S 17/931* (2020.01)

(58) Field of Classification Search
CPC ...... G01S 13/931; G01S 13/865; G01S 13/72; G01S 17/931
(Continued)

(56) References Cited

U.S. PATENT DOCUMENTS 10,031,231 B2 * 7/2018 Zermas ................. G01S 17/931
10,444,759 B2 * 10/2019 Douillard ............. G05D 1/0212
(Continued)

FOREIGN PATENT DOCUMENTS

CN 104778358 A 7/2015
CN 108490927 A 9/2018
(Continued)

OTHER PUBLICATIONS

Matlab Track-Level Fusion of Radar and Lidar Data. provided by wayback machine https://www.mathworks.com/help/fusion/ug/track-level-fusion-of-radar-and-lidar-data.html with date of Aug. 5, 2021. (Year: 2021).*
(Continued)

*Primary Examiner* — Michael W Justice
(74) *Attorney, Agent, or Firm* — Yue (Robert) Xu; Apex Attorneys at Law, LLP

(57) ABSTRACT

A multi-sensor fusion method and system for intelligent driving vehicles are provided, which relate to the technical field of intelligent driving vehicles. The method includes: establishing an extended target tracker based on a GM-PHD
(Continued)

algorithm and a rectangular target model of a detected object; processing detection information of a millimeter-wave radar by using the extended target tracker to obtain millimeter-wave radar track information of the detected object; processing detection information of a laser radar by using the established bounding-box detector and a JPDA tracker provided with an IMM-UKF to obtain laser-radar track information of the detected object; processing the millimeter-wave radar track information and the laser-radar track information by performing time-space conversion to obtain a central fusion node; and processing the central fusion node by using an IMF algorithm to obtain global track information.

6 Claims, 3 Drawing Sheets

(51) Int. Cl.
    *G01S 13/931*       (2020.01)
    *G01S 17/931*       (2020.01)
(58) Field of Classification Search
    USPC .............................. 342/70, 54; 701/536, 519
    See application file for complete search history.

(56)                References Cited

U.S. PATENT DOCUMENTS

| | | | | |
|---|---|---|---|---|
| 10,634,777 | B2 * | 4/2020 | Oh | .......................... G01S 13/60 |
| 11,068,756 | B2 * | 7/2021 | Browning | ............. G01S 13/003 |
| 11,124,185 | B2 * | 9/2021 | King | .................... B60W 50/023 |
| 11,450,016 | B1 * | 9/2022 | Lu | ............................. G06T 7/73 |
| 11,630,197 | B2 * | 4/2023 | Unnikrishnan | ......... G06F 18/23 |
| | | | | 382/104 |
| 11,879,964 | B2 * | 1/2024 | Wang | ..................... G01S 13/726 |
| 12,229,216 | B2 * | 2/2025 | Weintraub | .............. G06F 18/22 |
| 2018/0074203 | A1 * | 3/2018 | Zermas | ................... G06N 20/00 |
| 2018/0364717 | A1 * | 12/2018 | Douillard | .............. G01S 17/931 |
| 2019/0369222 | A1 * | 12/2019 | Oh | ......................... G01S 13/931 |
| 2020/0148201 | A1 * | 5/2020 | King | .................... G05D 1/0221 |
| 2020/0218913 | A1 * | 7/2020 | Unnikrishnan | ....... G01S 13/867 |
| 2020/0293837 | A1 * | 9/2020 | Browning | ............ G06F 18/256 |
| 2021/0264173 | A1 * | 8/2021 | Wang | ...................... G06T 7/277 |
| 2024/0104167 | A1 * | 3/2024 | Weintraub | .......... G06F 18/2325 |
| 2025/0131836 | A1 * | 4/2025 | Gu | ........................... G08G 5/51 |

FOREIGN PATENT DOCUMENTS

| | | |
|---|---|---|
| CN | 110596693 A | 12/2019 |
| CN | 112285700 A | 1/2021 |
| CN | 114325635 A | 4/2022 |
| CN | 115061139 A | 9/2022 |
| GB | 2607299 A | 12/2022 |
| KR | 20210011585 A | 2/2021 |

OTHER PUBLICATIONS

International Search Report for PCT/CN2023/096478 mailed Sep. 10, 2023, ISA/CN.

* cited by examiner

MULTI-SENSOR FUSION METHOD AND SYSTEM FOR INTELLIGENT DRIVING VEHICLES

The present application is the national phase of International Patent Application No. PCT/CN2023/096478, titled "MULTI-SENSOR FUSION METHOD AND SYSTEM FOR INTELLIGENT DRIVING VEHICLES", filed on May 26, 2023, which claims priority to Chinese patent application Ser. No. 20/221,0768001.5, titled "MULTI-SENSOR FUSION METHOD AND SYSTEM FOR INTELLIGENT DRIVING VEHICLES", filed on Jul. 1, 2022 with the China National Intellectual Property Administration, both of which are incorporated herein by reference in their entireties.

FIELD

The present disclosure relates to the technical field of intelligent driving vehicles, and in particular to a multi-sensor fusion method and system for intelligent driving vehicles.

BACKGROUND

In recent years, with the evolution of intelligence of vehicles, the intelligent driving vehicle technology attracts attentions. Perception and cognition are keys for intelligent driving vehicles, and provides a basis for decision-making in a driving process. The performance of perception and cognition directly affects the effect of controlling vehicles.

Common sensors include millimeter-wave radar based sensors and laser radar based sensors. The millimeter-wave radar based sensors have a large lateral position deviation and cannot obtain volume information of a target due to a large heading-angle deviation of the millimeter wave radar. The laser radar based sensors are not sensitive to speed changes of a target due to that the sensing accuracy of the laser radar based sensors is greatly affected in rainy or snowy weather and the laser radar cannot directly obtain speed information of the target.

An intelligent driving vehicle provided with a single sensor cannot adapt to complex driving environments. In order to improve the perception and cognition ability of the vehicle, the intelligent driving vehicles are usually provided with multiple sensors. However, with the change in the number of detected targets and the difference of measurement information of different sensors, it is difficult to perform multi-sensor fusion. With the improvement of sensor technology, an extended target may occupy multiple resolution units of a sensor, which may introduce a problem of combinatorial explosion in data association. In addition, the processing delay and the communication delay in transmitting data measured by the millimeter-wave radar and the laser radar may result in a timing problem caused by local track information being out of sequence.

SUMMARY

In view of the shortcomings of the conventional technology, a multi-sensor fusion method and system for intelligent driving vehicles are provided according to the present disclosure. The method includes: S1, establishing an extended target tracker based on a Gaussian mixture probability hypothesis density (GM-PHD) algorithm and a rectangular target model of a detected object, and processing two-dimensional detection information of a millimeter-wave radar using the extended target tracker to obtain millimeter-wave radar track information of the detected object; S2, establishing a bounding-box detector and establishing a joint probabilistic data association (JPDA) tracker provided with an interacting multiple model-unscented Kalman filter (IMM-UKF), and processing three-dimensional detection information of a laser radar using the bounding-box detector and the JPDA tracker provided with IMM-UKF to obtain laser radar track information of the detected object; and S3, processing the millimeter-wave radar track information and the laser radar track information by performing time-space conversion to obtain a central fusion node, and processing the central fusion node by using an information matrix fusion (IMF) algorithm to obtain global track information, and tracking the detected object based on the global track information.

In an embodiment, the establishing an extended target tracker includes: obtaining a rectangular extended target state of the detected object based on the rectangular target model of the detected object; and calculating, based on the rectangular extended target state of the detected object, a multi-target predicted PHD at a time instant k and a multi-target posterior PHD at the time instant k by using the GM-PHD algorithm to obtain the extended target tracker.

In an embodiment, the rectangular extended target state is expressed as:

$$\xi = (\gamma, x, X)$$

where $\xi$ represents a state vector of a detected-object extended target, $\gamma$ represents a measurement rate state of the detected-object extended target, x represents a motion state of the detected-object extended target, and X represents an extended state of the detected-object extended target.

In an embodiment, the establishing a bounding-box detector includes: pre-processing laser radar data by using a random sample consensus (RANSAC) based plane fitting algorithm to obtain target point clouds; clustering the target point clouds by using an Euclidean algorithm; and establishing, based on clustered target point clouds, a state vector of the bounding-box detector to obtain the bounding-box detector.

In an embodiment, the state vector of the bounding-box detector is expressed as:

$$x' = [x, y, v, \theta, \omega, z, \dot{z}, L, W, H]^T$$

where x' represents the state vector, x represents an abscissa of a detected target, y represents an ordinate of the detected target, v represents a speed of the detected target, $\theta$ represents a direction angle of the detected target, $\omega$ represents an angular speed of the detected target, z represents vertical coordinates of the detected target, $\dot{Z}$ represents a vertical speed of the detected target, L represents a length of the detected target, W represents a width of the detected target, and H represents a height of the detected target.

In an embodiment, the establishing a JPDA tracker provided with an IMM-UKF includes: configuring the JPDA tracker provided with the IMM-UKF to include an input interaction module, a UKF filtering module, a probability updating module, a JPDA data association module and an output fusion module; calculating, by the input interaction module based on a first state estimation and a first covariance matrix of a UKF filter in the UKF filtering module at a time instant k, a second state estimation and a second covariance matrix, and outputting, by the input interaction module, the second state estimation and the second covariance matrix; outputting, by the UKF filter in the UKF filtering module based on an output of the input interaction module and an effective observation vector at the time instant k, a third state estimation and a third covariance matrix at a time instant k+1; calculating, by the probability updating module based on residual information of the UKF filtering module, a conditional probability of a motion model at the time instant k+1; calculating, by the JPDA data association module based on the third state estimation, the third covariance matrix, and first measurement information of a target under the motion model, second measurement information of the target under the motion model at the time instant k+1; and calculating, by the output fusion module based on the conditional probability of the motion model at the time instant k+1, the second measurement information, the third state estimation and the third covariance matrix, a fused state estimation and a fused covariance matrix.

In an embodiment, the processing the central fusion node by using an IMF algorithm includes:

updating a covariance by using the following equation:

$$P(k|k) = P(k|k-1)^{-1} + \sum_{i=1}^{N_k} \left( P_i(k|k)^{-1} - P_i(k|k-1)^{-1} \right)^{-1};$$

and updating a state estimation by using the following equation:

$$\hat{x}(k|k) = P(k|k)\left( P(k|k-1)^{-1}\hat{x}(k|k-1) \right) +$$

$$\sum_{i=1}^{N_k} \left( P_i(k|k)^{-1}\hat{x}_i(k|k) - P_i(k|k-1)^{-1}\hat{x}_i(k|k-1) \right),$$

where P(k|k) represents a global covariance of sensors from a time instant 0 to a time instant k, P(k|k−1) represents a global covariance of the sensors from the time instant 0 to a time instant k−1, $P_i$(k|k) represents a local covariance of an i-th sensor from the time instant 0 to the time instant k, $P_i$(k|k−1) represents a local covariance of the i-th sensor from the time instant 0 to the time instant k−1, $N_k$ represents the number of the sensors, $\hat{x}$(k|k) represents a global state estimation of the sensors from the time instant 0 to the time instant k, $\hat{x}$(k|k−1) represents a global state estimation of the sensors from the time instant 0 to the time instant k−1, $\hat{x}_i$(k|k) represents a local state estimation of the i-th sensor from the time instant 0 to the time instant k, and $\hat{x}_i$(k|k−1) represents a local state estimation of the i-th sensor from the time instant 0 to the time instant k−1.

A multi-sensor fusion system for intelligent driving vehicles is provided. The system is configured to perform the multi-sensor fusion method for intelligent driving vehicles. The system includes: an extended-target tracking module, a bounding-box detector module, a point target tracking module, and a track fusion module.

The extended-target tracking module is configured to process the two-dimensional detection information of the millimeter-wave radar based on the GM-PHD algorithm and the rectangular target model of the detected object to obtain millimeter-wave radar track information of the detected object.

The bounding-box detector module is configured to process the three-dimensional detection information of the laser radar by using the RANSAC based plane fitting algorithm and the Euclidean algorithm to obtain three-dimensional information of the detected object.

The point-target tracking module is configured to process the three-dimensional information of the detected object by using the JPDA tracker provided with the IMM-UKF to obtain the laser radar track information of the detected object.

The track fusion module is configured to fuse the millimeter-wave radar track information of the detected object and the laser radar track information of the detected object to obtain the global track information.

According to the present disclosure, the following beneficial effects can be achieved. In the present disclosure, based on two-dimensional detection information of a millimeter-wave radar, an extended target tracker is established by using a GM-PHD algorithm, thereby tracking a track of a detected object; and based on three-dimensional point cloud information of a laser radar, laser radar data is pre-processed by using a RANSAC algorithm to remove unnecessary point clouds, and a bounding-box detector is established based on an Euclidean distance clustering algorithm. Further, a JPDA tracker provided with an IMM-UKF is established to track the track of the detected object, thereby solving the problem of combinatorial explosion in data association. A state space for track fusion is established based on a state space of the laser radar, and conversion from the state space of the millimeter-wave radar to a track state space is performed. Furthermore, a global track is obtained by fusing a track of the laser radar and a track of the millimeter-wave radar by using an IMF algorithm, solving the timing problem caused by local track information being out of sequence of different sensors. Compared with the conventional technology, with the present disclosure, the overall perception accuracy can be improved, and bandwidth requirements and computation costs are reduced. In addition, when a sensor fails, another sensor may be used for compensation, thereby improving the practicability.

DETAILED DESCRIPTION OF THE EMBODIMENTS

Technical solutions of embodiments of the present disclosure are clearly and completely described below in conjunction with the drawings of the embodiments of the present disclosure. Apparently, the embodiments described in the following are only some embodiments of the present disclosure, rather than all the embodiments. Any other embodiments obtained by those skilled in the art based on the embodiments in the present disclosure without any creative effort fall within the protection scope of the present disclosure.

Figure 1:
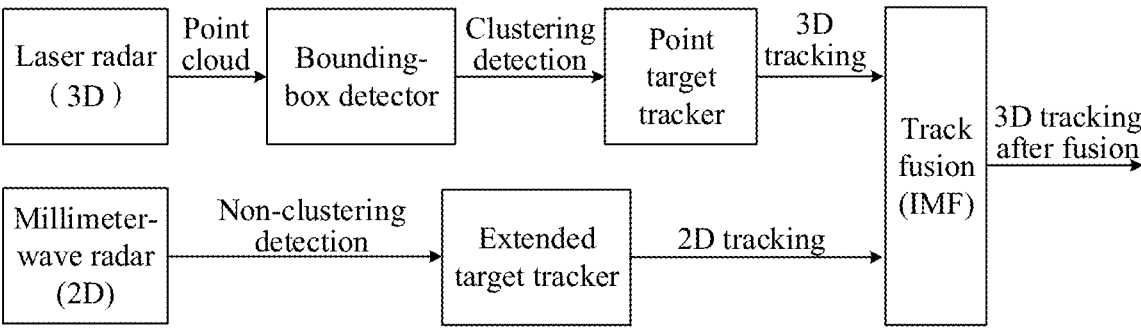
FIG. 1 is a flowchart of a multi-sensor fusion method for intelligent driving vehicles according to the present disclosure.

A multi-sensor fusion method for intelligent driving vehicles is provided according to the present disclosure. As shown in FIG. 1, the method includes the following steps S1 to S3.

In step S1, an extended target tracker is established based on a Gaussian mixture probability hypothesis density (GM-PHD) algorithm and a rectangular target model of a detected object, and two-dimensional detection information of a millimeter-wave radar is processed by using the extended target tracker to obtain millimeter-wave radar track information of the detected object.

The millimeter-wave radar is prone to detect a single detected target as multiple targets. In order to solve the problem, an extended target tracker is established based on a GM-PHD algorithm and a rectangular target model of the detected object in the present disclosure, tracking the detected object, that is, an intelligent driving vehicle. The extended target tracker is established by performing the following operations.

Figure 2:
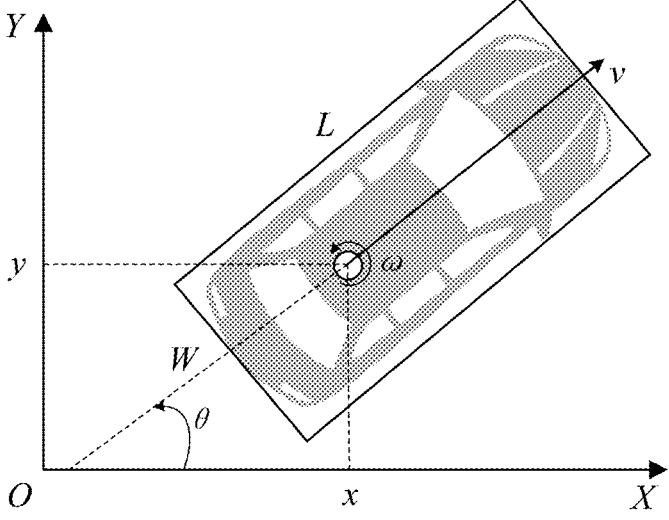
FIG. 2 is a schematic diagram of a rectangular target model according to the present disclosure.

A rectangular target model of the detected object is obtained. As shown in FIG. 2, a rectangular extended target state of the detected object is obtained based on the rectangular target model of the detected object. The rectangular extended target state is expressed as:

$$\xi = (\gamma, x, X)$$

In the above equation, $\xi$ represents a state vector of a detected-object extended target. $\gamma$ represents a measurement rate state of the detected-object extended target, and is a scalar following a gamma distribution. x represents a motion state of the detected-object extended target. The vector x may be modeled as $x=[x, y, v, \theta, \omega, L, W]^T$, where $[x, y]^T$ represents two-dimensional coordinate position information of a detected target, v, $\theta$, and $\omega$ respectively represent a speed, a direction angle and an angular speed of the detected target, and L and W respectively represent a length and a width of the detected target. X represents an extended state of the detected-object extended target, that is, a state of a single piece of measurement information after extension. In a case that measurements of an extended target are randomly distributed in a space, the extended state of the extended target may be approximately described by using a rectangle.

A GM-PHD filter is established based on the rectangular extended target state of the detected object. The GM-PHD filter, with a Gaussian component having a weight, approximates a multi-target probability hypothesis density. It is assumed that a multi-target posterior PHD at a time instant k−1 may be expressed in a Gaussian mixture form as:

$$D_{k-1}(x) = \sum_{i=1}^{J_{k-1}} \omega_{k-1}^i N\left(x; m_{k-1}^i, P_{k-1}^i\right)$$

where $J_{k-1}$ represents the number of Gaussian components at the time instant k−1, $$\omega_{k-1}^i$$

represents a weight of an i-th Gaussian component, N(gm, P) represents a probability density function of the Gaussian distribution, $$N\left(x; m_{k-1}^i, P_{k-1}^i\right)$$

represents a probability density function of the i-th Gaussian distribution at the time instant k−1 with a mean of $$m_{k-1}^i$$

and a covariance of $$P_{k-1}^i.$$

A multi-target predicted PHD at a time instant k and a multi-target posterior PHD at the time instant k may be respectively expressed in the Gaussian mixture form as:

$$D_{k|k-1}(x) = D_{S,k|k-1}(x) + \gamma_k(x) = \sum_{i=1}^{J_{k|k-1}} \omega_{k|k-1}^i N\left(x; m_{k|k-1}^i, P_{k|k-1}^i\right)$$

$$D_{k|k}(x) = (1 - p_{D,k})D_{k|k-1}(x) + \sum_{z \in z_k} \sum_{j=1}^{J_{k|k-1}} \omega_k^j(z)N\left(x; m_{k|k}^j(z), P_{k|k}^j\right)$$

In the above equations, x represents a motion state of the rectangular extended target state of the detected object, $D_{k|k-1}$ (x) represents the multi-target predicted PHD at the time instant k, $D_{S,k|k-1}$ (x) represents a PHD of a surviving Gaussian component at the time instant k, $\gamma_k$ (x) represents a PHD of a newly generated target (that is, a PHD of a new observation point obtained by the sensor) at the time instant k, $$\omega_{k|k}^i$$

represents a weight of the i-th Gaussian component at the time instant k, $$N\left(x; m_{k|k-1}^i, P_{k|k-1}^i\right)$$

represents a Gaussian component with a mean of $$m_{k-1}^i$$

and a covariance of $$P_{k-1}^i, J_{k|k-1}$$

represents the predicted number of Gaussian components at the time instant k, $D_{k|k}(x)$ represents a multi-target posterior PHD at the time instant k; and $P_{D,k}$ represents a target detection probability. In a case that a signal exists at an input terminal of the radar, it may be determined that "there is a signal" or "there is no signal" due to noise. $P_{D,k}$ represents a probability of determining that "there is a signal" and the signal exists.

$$\omega_k^j(z)$$

represents a weight of a j-th updated component. $z_k$ represents a target measurement value (that is, physical information value such as target coordinates obtained by the radar) at the time instant k.

$$N\left(x; m_{k|k}^i(z), P_{k|k}^i\right)$$

represents a Gaussian component with a mean of $$m_{k|k}^j(z)$$

and a covariance of $$P_{k|k}^j.$$

The GM-PHD filter is established by predicting $D_{k|k-1}(x)$ and updating $D_{k|k}(x)$ by using the GM-PHD algorithm, then a 2D local tracker, that is the extended target tracker, applicable to the millimeter-wave radar is obtained.

The two-dimensional detection information of the millimeter-wave radar is processed by using the extended target tracker to obtain millimeter-wave radar track information of the detected object.

For the conventional trackers such as the joint probabilistic data association (JPDA) tracker, it is generally assumed that a sensor outputs at most one piece of measurement information after the sensor scans a single target, thus it is required for a high-resolution sensor provided with the conventional tracker to perform clustering processing before performing data association and outputting measurement information, increasing computing costs and seriously affecting measurement accuracy. With the extended target tracker established by using the GM-PHD algorithm and the rectangular target model, clustering processing and data association may be performed simultaneously, reducing computing costs and increasing measurement accuracy.

In step S2, a bounding-box detector and a JPDA tracker provided with an IMM-UKF are established, and three-dimensional detection information of a laser radar is processed by using the bounding-box detector and the JPDA tracker provided with the IMM-UKF to obtain laser radar track information of the detected object.

For each of targets, the amount of measurement information obtained by the laser radar is much greater than the amount of measurement information obtained by the millimeter-wave radar. In addition, the laser radar may further obtain ground measurement information. The amount of data outputted by the laser radar is not in a same order of magnitude as the amount of data outputted by the millimeter-wave radar. If the extended target tracker directly processes the data, an outputted signal is to be seriously delayed due to high computing complexity. In view of this, the bounding-box detector is established to process the three-dimensional detection information of the laser radar in the present disclosure. The bounding-box detector is established by performing the following operations.

Laser radar data is pre-processed by using a random sample consensus (RANSAC) based plane fitting algorithm to remove information of unnecessary point clouds such as the ground point cloud to obtain a target point cloud, reducing the computing costs. Specifically, three points are randomly selected from an initial point cloud and a sampling plane formed by the three points is calculated. Distances from all point clouds to the sampling plane are calculated, a distance threshold is configured, and the point clouds are divided into inner points (normal data) and outer points (abnormal data) based on the threshold. Then, the number of the inner points and the number of the outer points are counted. The above processes are repeated until a maximum iteration number is reached, and a plane including a maximum number of inner points is selected. Finally, based on the plane including the maximum number of inner points, fitting is performed based on the inner points included in the plane to obtain a final fitting plane equation. The unnecessary point clouds such as the ground point cloud is removed based on the final fitting plane equation to obtain the target point clouds.

After the unnecessary point clouds are removed, point clouds belonging to various main targets are presented in a floating and separated state in space. For the detected object, a rectangular bounding-box detector is adopted. The target point clouds in this state are clustered by using an Euclidean algorithm, and then a state vector of the bounding-box detector is obtained based on a clustering result. The state vector of the bounding-box detector is expressed as:

$$x' = [x, y, v, \theta, \omega, z, \dot{z}, L, W, H]^T$$

In the above equation, x' represents the state vector. Compared with the state vector of the rectangular model of the millimeter-wave radar, the state vector of the rectangular bounding-box detector includes three more variables z, Ż and H, where z represents vertical coordinates of the detected target, Ż represents a vertical speed of the detected target, and H represents a height of the detected target.

Figure 3:
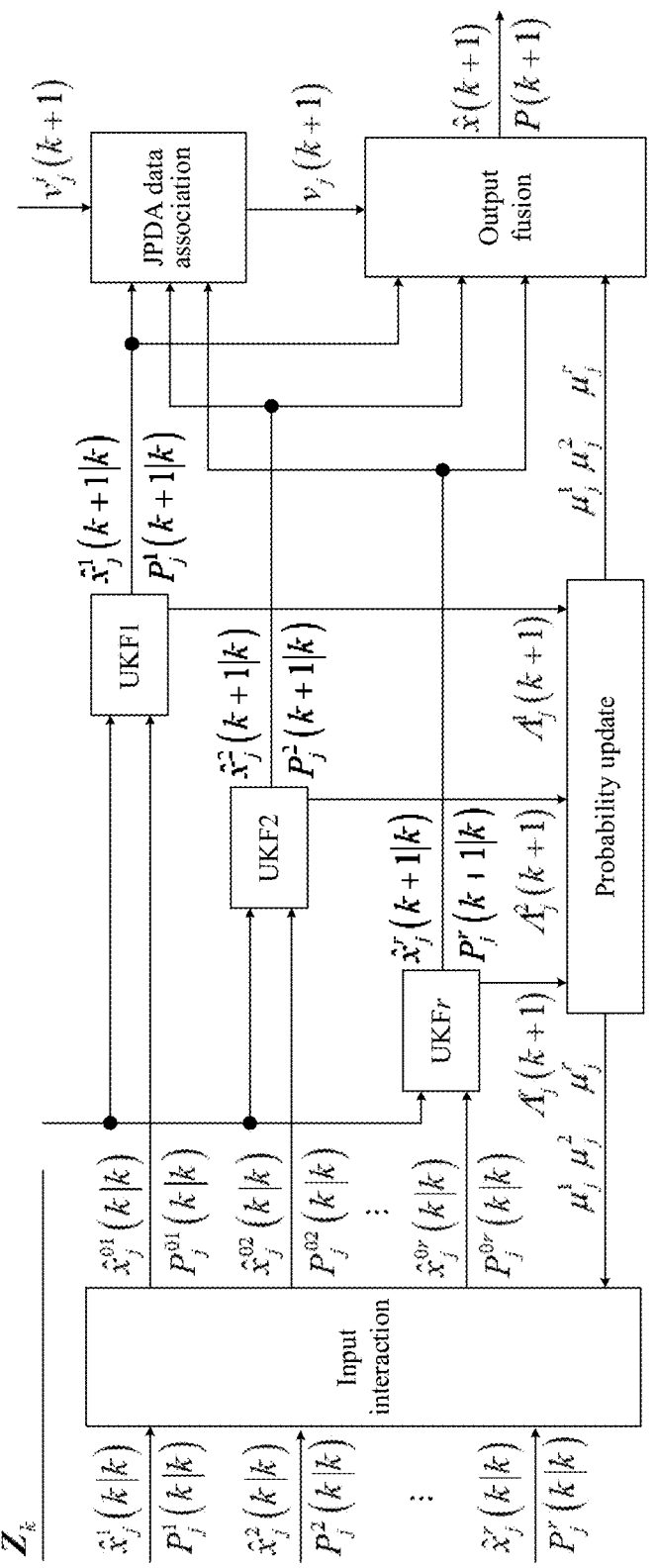
FIG. 3 is a schematic diagram of a framework of a JPDA tracker provided with an IMM-UKF according to the present disclosure.

As shown in FIG. 3, the process of establishing a joint probabilistic data association (JPDA) tracker provided with an interacting multiple model-unscented Kalman filter (IMM-UKF), that is, a point target tracker, includes the following operations. The JPDA tracker provided with the IMM-UKF is configured to include an input interaction module, a UKF filtering module, a probability updating module, a JPDA data association module and an output fusion module, and is configured to track a track of the object detected by the laser radar.

The UKF filter obtains a first state estimation $$\hat{x}_j^i(k \mid k)$$

at the time instant k based on the state vector x' of the bounding-box detector.

The input interaction module calculates a second state estimation $$\hat{x}_j^{0i}(k \mid k)$$

and a second covariance matrix $$P_j^{0i}(k \mid k)$$

after interaction of multiple targets based on the first state estimation $$\hat{x}_j^i(k \mid k)$$

obtained by the UKF filter in the UKF filtering module at the time instant k and a first covariance matrix $$P_j^i(k \mid k),$$

and outputs the second state estimation and the second covariance matrix. j represents a motion model, which is a speed model established based on the motion state of the target. i=1, 2, . . . , and r, where r represents the number of UKF filters.

The UKF filter in the UKF filtering module outputs a third state estimation $$\hat{x}_j^i(k + 1 \mid k)$$

and a third covariance matrix $$P_j^i(k + 1 \mid k)$$

at a time instant k+1 based on an output of the input interaction module and an effective observation vector $z_k$ at the time instant k.

The probability updating module calculates a conditional probability $$\mu_j^i(k + 1)$$

of a motion model j at the time instant k+1 based on residual information of the UKF filtering module, where $$\Lambda_j^i(k + 1)$$

represents the residual information of the UKF filter.

The JPDA data association module calculates second measurement information $\tilde{v}_j(k+1)$ of the target under the motion model j at the time instant k+1 based on first measurement information $$v_j^i(k + 1)$$

of the target under the motion model and an association probability (the third state estimation and the third covariance matrix). The first measurement information is measurement information such as a target vehicle speed.

The output fusion module calculates a fused state estimation and a fused covariance matrix based on the conditional probability $$\mu_j^i(k + 1)$$

of the motion model j at the time instant k+1, the second measurement information $\tilde{v}_j(k+1)$, the third state estimation $$\hat{x}_j^i(k + 1 \mid k)$$

and the third covariance matrix $$P_j^i(k + 1 \mid k).$$

That is, the UKF filter with a small estimation error is controlled to output a fusion tracking output, thereby obtaining a fused state estimation $\hat{x}(k+1)$ and a fused covariance matrix P(k+1).

Based on the above operations, a 3D local tracker applicable to the laser radar, that is, the JPDA tracker provided with the IMM-UKF, is obtained.

The three-dimensional detection information of the laser radar is processed by using the bounding-box detector and the JPDA tracker provided with the IMM-UKF to obtain the laser radar track information of the detected object. With the method, the computing costs can be reduced without increasing hardware costs, thereby effectively reducing the delay of outputting the laser radar track information.

In step S3, the millimeter-wave radar track information and the laser radar track information are processed by performing time-space conversion to obtain a central fusion node, the central fusion node is processed by using an IMF algorithm to obtain global track information, and the detected object is tracked based on the global track information.

The measurement information of the millimeter-wave radar and the measurement information of the laser radar are respectively processed by using a 2D local tracker and a 3D local tracker, and then two local tracks, that is, the millimeter-wave radar track information of the detected object and the laser radar track information of the detected object, are obtained. The local track information is unified to a same coordinate system at same time nodes by performing the time-space conversion, and the fusion central node is established, thereby realizing data association of different track information. The processing delay and the communication delay in transmitting data measured by the millimeter-wave radar and the laser radar may result in a timing problem caused by local track information being out of sequence. In order to solve the problem, it is required to calculate a covariance between the two sensors, and then a repeated value is subtracted. In view of this, in the fusion central node, the 2D local track and the 3D local track are updated by using the information matrix fusion (IMF) algorithm.

Figure 4:
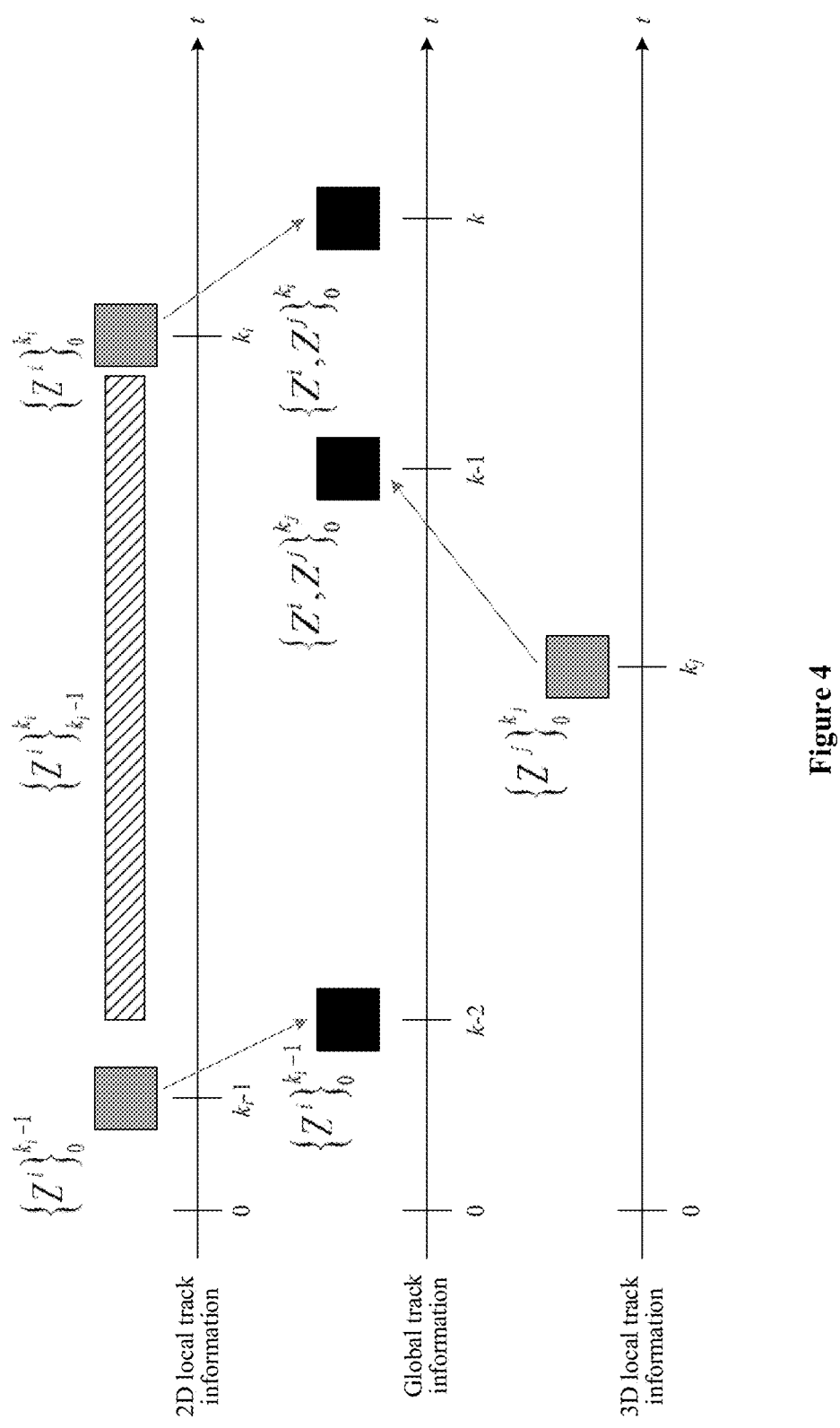
FIG. 4 is a schematic diagram showing a process of fusing and updating tracks according to the present disclosure.

FIG. 4 shows a track update process. At a time instant $k-2$, the global track information only includes 2D local track information from a time instant 0 to a time instant $k_i-1$. At the time instant $k-1$, the global track information is fused with 3D local track information from the time instant 0 to a time instant $k_j$ based on the existing information. That is, the global track information includes 2D local track information and 3D local track information from the time instant 0 to the time instant $k_j$. However, in a case that the global track information, at the time instant k, is directly fused with the 2D local track information at the time instant $k_i$, repeated fusion of information may be caused due to that the above fused information includes the 2D local track information from the time instant $k_1-1$ to the time instant $k_i$ that is really required and the repeated 2D local track information from the time instant 0 to the time instant $k_i-1$.

With the IMF algorithm, repeated fusion of track information in the updating process may be avoided. The fused track data is updated by updating the covariance and the state estimation to avoid old data entering a new target, thereby avoiding repeated fusion. The algorithm is performed by:

updating a covariance by using the following equation:

$$P(k|k) = P(k|k-1)^{-1} + \sum_{i=1}^{N_k}(P_i(k|k)^{-1} - P_i(k|k-1)^{-1})^{-1};$$

and updating a state estimation by using the following equation:

$$\hat{x}(k|k) = P(k|k)\big(P(k|k-1)^{-1}\hat{x}(k|k-1)\big) +$$

$$\sum_{i=1}^{N_k}(P_i(k|k)^{-1}\hat{x}_i(k|k) - P_i(k|k-1)^{-1}\hat{x}_i(k|k-1))$$

In the above equations, $P(k1|k)$ represents a global covariance of sensors from the time instant 0 to the time instant k and corresponds to the global track information; $P(k|k-1)$ represents a global covariance of the sensors from the time instant 0 to the time instant $k-1$; $P_i(k|k)$ represents a local covariance of an i-th sensor from the time instant 0 to the time instant k and corresponds to the local track information; $P_i(k|k-1)$ represents a local covariance of the i-th sensor from the time instant 0 to the time instant $k-1$; $N_k$ represents the number of the sensors; $\hat{x}(k|k)$ represents a global state estimation of the sensors from the time instant 0 to the time instant k; $\hat{x}(k|k-1)$ represents a global state estimation of the sensors from the time instant 0 to the time instant $k-1$; $\hat{x}_i(k|k)$ represents a local state estimation of the i-th sensor from the time instant 0 to the time instant k; and $\hat{x}_i(k|k-1)$ represents a local state estimation of the i-th sensor from the time instant 0 to the time instant $k-1$. The sensors are millimeter-wave radars or laser radars.

Two local tracks are fused by using the IMF algorithm to obtain the global track information. The user may track an intelligent driving vehicle based on the global track information.

A multi-sensor fusion system for intelligent driving vehicles is further provided according to the present disclosure. The system is configured to perform the multi-sensor fusion method for intelligent driving vehicles. The system includes: an extended-target tracking module, a bounding-box detector module, a point target tracking module and a track fusion module.

The extended-target tracking module is configured to process two-dimensional detection information of the millimeter-wave radar based on the GM-PHD algorithm and the rectangular target model of the detected object to obtain millimeter-wave radar track information of the detected object.

The bounding-box detector module is configured to process three-dimensional detection information of the laser radar by using the RANSAC based plane fitting algorithm and the Euclidean algorithm to obtain three-dimensional information of the detected object.

The point target tracking module is configured to process the three-dimensional information of the detected object by using the JPDA tracker provided with the IMM-UKF to obtain the laser radar track information of the detected object.

The track fusion module is configured to fuse the millimeter-wave radar track information of the detected object and the laser radar track information of the detected object to obtain the global track information.

The above embodiments further illustrate the objectives, the technical solutions, and the advantages of the present disclosure in detail. It should be noted that the above embodiments are only preferred embodiments of the present disclosure and are not intended to limit the present disclosure. Any modifications, equivalent substitutions, improvements, and the like made to the present disclosure within the spirit and principle of the present disclosure should be included in the protection scope of the present disclosure.

The invention claimed is:

1. A multi-sensor fusion method for intelligent driving vehicles, comprising:

S1: establishing an extended target tracker based on a Gaussian mixture probability hypothesis density (GM-PHD) algorithm and a rectangular target model of a detected object, and processing two-dimensional detection information of a millimeter-wave radar by using the extended target tracker to obtain millimeter-wave radar track information of the detected object;

S2: establishing a bounding-box detector and establishing a joint probabilistic data association (JPDA) tracker provided with an interacting multiple model-unscented Kalman filter (IMM-UKF), and processing three-dimensional detection information of a laser radar by using the bounding-box detector and the JPDA tracker provided with the IMM-UKF to obtain laser radar track information of the detected object; and S3: processing the millimeter-wave radar track information and the laser radar track information by performing time-space conversion to obtain a central fusion node, processing the central fusion node by using an information matrix fusion (IMF) algorithm to obtain global track information, tracking the detected object based on the global track information, and controlling a driving process of the intelligent driving vehicles based on the global track information;

wherein the establishing an extended target tracker comprises:

obtaining a rectangular extended target state of the detected object based on the rectangular target model of the detected object; and calculating, based on the rectangular extended target state of the detected object, a multi-target predicted PHD at a time instant k and a multi-target posterior PHD at the time instant k by using the GM-PHD algorithm to obtain the extended target tracker.

2. The multi-sensor fusion method for intelligent driving vehicles according to claim 1, wherein the rectangular extended target state is expressed as:

$$\xi = (\gamma, x, X)$$

where $\xi$ represents a state of a detected-object extended target, y represents a measurement rate state of the detected-object extended target, x represents a motion state of the detected-object extended target, and X represents an extended state of the detected-object extended target.

3. The multi-sensor fusion method for intelligent driving vehicles according to claim 1, wherein the establishing a bounding-box detector comprises:

pre-processing laser radar data by using a random sample consensus (RANSAC) based plane fitting algorithm to obtain target point clouds;

clustering the target point clouds by using an Euclidean algorithm; and establishing, based on clustered target point clouds, a state vector of the bounding-box detector to obtain the bounding-box detector.

4. The multi-sensor fusion method for intelligent driving vehicles according to claim 3, wherein the state vector of the bounding-box detector is expressed as:

$$x' = [x, y, v, \theta, \omega, z, \dot{z}, L, W, H]^T$$

where x' represents the state vector, x represents an abscissa of a detected target, y represents an ordinate of the detected target, v represents a speed of the detected target, $\theta$ represents a direction angle of the detected target, $\omega$ represents an angular speed of the detected target, z represents vertical coordinates of the detected target, $\dot{Z}$ represents a vertical speed of the detected target, L represents a length of the detected target, W represents a width of the detected target, and H represents a height of the detected target.

5. The multi-sensor fusion method for intelligent driving vehicles according to claim 1, wherein the establishing a JPDA tracker provided with an IMM-UKF comprises:

configuring the JPDA tracker provided with the IMM-UKF to comprise an input interaction module, a UKF filtering module, a probability updating module, a JPDA data association module and an output fusion module;

calculating, by the input interaction module based on a first state estimation and a first covariance matrix of a UKF filter in the UKF filtering module at a time instant k, a second state estimation and a second covariance matrix, and outputting, by the input interaction module, the second state estimation and the second covariance matrix;

outputting, by the UKF filter in the UKF filtering module based on an output of the input interaction module and an effective observation vector at the time instant k, a third state estimation and a third covariance matrix at a time instant k+1;

calculating, by the probability updating module based on residual information of the UKF filtering module, a conditional probability of a motion model at the time instant k+1;

calculating, by the JPDA data association module based on the third state estimation, the third covariance matrix, and first measurement information of a target under the motion model, second measurement information of the target under the motion model at the time instant k+1; and calculating, by the output fusion module based on the conditional probability of the motion model at the time instant k+1, the second measurement information, the third state estimation and the third covariance matrix, a fused state estimation and a fused covariance matrix.

6. The multi-sensor fusion method for intelligent driving vehicles according to claim 1, wherein the processing the central fusion node by using an IMF algorithm comprises:

updating a covariance by using the following equation:

$$P(k|k) = P(k|k-1)^{-1} + \sum_{i=1}^{N_k} \left( P_i(k|k)^{-1} - P_i(k|k-1)^{-1} \right)^{-1};$$

and updating a state estimation by using the following equation:

$$\hat{x}(k|k) = P(k|k)\left( P(k|k-1)^{-1}\hat{x}(k|k-1) \right) +$$

$$\sum_{i=1}^{N_k} \left( P_i(k|k)^{-1}\hat{x}_i(k|k) - P_i(k|k-1)^{-1}\hat{x}_i(k|k-1) \right),$$

where P(k|k) represents a global covariance of sensors from a time instant 0 to a time instant k, P(k|k−1) represents a global covariance of the sensors from the time instant 0 to a time instant k−1, $P_i$(k|k) represents a local covariance of an i-th sensor from the time instant 0 to the time instant k, $P_i$(k|k−1) represents a local covariance of the i-th sensor from the time instant 0 to the time instant k−1, $N_k$ represents the number of the sensors, $\hat{x}$(k|k) represents a global state estimation of the sensors from the time instant 0 to the time instant k, $\hat{x}$(k|k−1) represents a global state estimation of the sensors from the time instant 0 to the time instant k−1, $\hat{x}_i$(k|k) represents a local state estimation of the i-th sensor from the time instant 0 to the time instant k, and $\hat{x}_i$(k|k−1) represents a local state estimation of the i-th sensor from the time instant 0 to the time instant k−1.

* * * * *